(12) United States Patent
Kitagawa et al.

(10) Patent No.: US 7,889,365 B2
(45) Date of Patent: Feb. 15, 2011

(54) IMAGE FORMING APPARATUS

(75) Inventors: Takashi Kitagawa, Yamatokoriyama (JP); Katsuhiro Nagayama, Nara (JP); Masayuki Otsuka, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 617 days.

(21) Appl. No.: 12/007,074

(22) Filed: Jan. 7, 2008

(65) Prior Publication Data

US 2008/0170250 A1 Jul. 17, 2008

(30) Foreign Application Priority Data

Jan. 12, 2007 (JP) ............................ 2007-004855

(51) Int. Cl.
H04N 1/403 (2006.01)
H04N 1/40 (2006.01)
H04N 1/46 (2006.01)
H04N 1/21 (2006.01)
G06F 3/12 (2006.01)

(52) U.S. Cl. ...................... 358/1.13; 358/2.9; 358/3.02; 358/515; 358/462; 358/466

(58) Field of Classification Search ................ 358/1.18; 356/402; 702/170; 399/12; 600/454
See application file for complete search history.

(56) References Cited

U.S. PATENT DOCUMENTS

| | | | | |
|---|---|---|---|---|
| 4,830,501 | A | * | 5/1989 | Terashita ..................... 358/515 |
| 5,105,817 | A | * | 4/1992 | Uchibori et al. ............. 600/454 |
| 7,206,524 | B2 | * | 4/2007 | Yokoe .......................... 399/12 |
| 7,231,315 | B2 | * | 6/2007 | Fujimoto .................... 702/170 |

| | | | |
|---|---|---|---|
| 2005/0073719 | A1 | * 4/2005 | Amela et al. ................ 358/1.18 |

FOREIGN PATENT DOCUMENTS

| | | |
|---|---|---|
| JP | 6-325029 A | 11/1994 |
| JP | 8-147319 A | 6/1996 |
| JP | 8-262820 | 10/1996 |
| JP | 2003-091224 | 3/2003 |
| JP | 2004-64552 A | 2/2004 |
| JP | 2005-181534 A | 7/2005 |
| JP | 2005-181804 A | 7/2005 |
| JP | 2005-352379 | 12/2005 |
| JP | 2006-106335 A | 4/2006 |
| JP | 2006-201457 A | 8/2006 |
| JP | 2006-330686 A | 12/2006 |

OTHER PUBLICATIONS

English translation of the International Preliminary Report on Patentability mailed Aug. 30, 2007 in corresponding PCT Application No. PCT/JP2006/302177.

* cited by examiner

*Primary Examiner*—King Y Poon
*Assistant Examiner*—Akwasi M Sarpong
(74) *Attorney, Agent, or Firm*—Nixon & Vanderhye, P.C.

(57) ABSTRACT

An image forming apparatus includes: an image forming section; a manual setting mode for enabling a user to provide instruction of timing for executing a process control of the image forming section; a cumulative operation information management section for calculating and storing cumulative operation information after the execution of the previous process control; a threshold value setting section for setting, to a threshold value, the cumulative operation information at the point when the instruction is provided in the manual setting mode; and a process control management section for executing a process control and resetting the cumulative operation information at timing when the cumulative operation information reaches the threshold value.

19 Claims, 12 Drawing Sheets

HIGH-DENSITY CORRECTION TEST PATCH

Vbp: DEVELOPING BIAS VOLTAGE UPON PREVIOUS EXECUTION OF PC (INITIAL VALUE −325 V)

TONE CORRECTION TEST PATCH

IMAGE FORMING APPARATUS

CROSS-REFERENCE TO RELATED APPLICATION

This application is related to Japanese Patent Application No. 2007-004855 filed on Jan. 12, 2007, whose priority is claimed and the disclosure of which is incorporated by reference in its entirety.

BACKGROUND OF THE INVENTION

1. Field of the Invention

The present invention relates to an image forming apparatus that performs image formation with an electrophotographic system, such as a copier, laser printer, facsimile, etc.

2. Description of Related Art

An image forming apparatus such as a copier includes a photoconductor drum, a charging device for uniformly charging the photoconductor drum, an exposure device for exposing the photoconductor drum so as to form a latent image, and a developing device for developing the latent image. Characteristic change appears in these components and developer stored in the developing device due to environmental change such as temperature or humidity, or due to time-course change. The characteristic change changes the formation state of the image obtained by charging the photoconductor drum, exposing the drum, and developing a latent image. There has been known a technique in which a process, called a process control, for changing an image forming condition at a predetermined timing is executed in order to reduce the change of the formation state of the image (refer to Patent Documents 1 and 2).

In the process control, in general, an image of a test pattern is actually formed, the density of the formed image is measured, and an image forming condition is changed for eliminating the difference between the measured value and the ideal value. Therefore, when the process control is executed, toner is somewhat consumed. During the execution of the process control, a user who cannot use the image forming apparatus may have to suffer inconvenience.

When timing for executing the process control is too late, the image formation state becomes unstable, while when the timing for executing the process control is too early, toner is wastefully consumed, or job efficiency is wastefully reduced. Accordingly, it is important that the process control is executed at appropriate timing.

In the Patent Document 1: Japanese Unexamined Patent Application No. 2003-91224, the timing for executing the process control is made appropriate by determining the timing for executing the process control on the basis of the ratio of the number of monochrome printing sheets and the number of color printing sheets.

In the Patent Document 2: Japanese Unexamined Patent Application No. 2005-352379, the apparatus recognizes that a printing with an printing area ratio of 3 to 30% is a text printing, and the number of printing sheets for which the process control is executed is switched between the text printing and color printing, whereby the timing for executing the process control is made appropriate.

To what degree the deterioration of a printing quality is allowed is generally different from each user. In the techniques in the Patent Documents 1 and 2, timing of the process control optimum for each user cannot be set.

SUMMARY OF THE INVENTION

The present invention is accomplished in view of the above-mentioned circumstances, and aims to provide an image forming apparatus that can execute a process control at timing optimum for each user.

An image forming apparatus according to the present invention includes an image forming section including a photoconductor drum, a charging device for uniformly charging the photoconductor drum, an exposure device for exposing the photoconductor drum so as to form a latent image, and a developing device for depositing toner onto the latent image using a developing roller to develop the latent image, and a manual setting mode for enabling a user to provide instruction of timing for executing a process control of the image forming section, the image forming apparatus including a cumulative operation information management section for calculating and storing cumulative operation information after the execution of the previous process control, a threshold value setting section for setting, to a threshold value, the cumulative operation information at the point when the instruction is provided in the manual setting mode, and a process control management section for executing a process control and resetting the cumulative operation information at timing when the cumulative operation information reaches the threshold value.

In the image forming apparatus according to the present invention, the timing for executing the process control can be instructed when a user recognizes deterioration in printing quality, the cumulative operation information up to the time of the instruction is set as the threshold value, and the next and following process controls are executed when the cumulative operation information reaches the threshold value. The process control can be executed at timing optimum for each user by setting the timing for executing the process control with this method.

BRIEF DESCRIPTION OF THE DRAWINGS

FIG. 2 is a flowchart showing a flow of an operation when a power supply of the image forming apparatus according to the first embodiment of the present invention is turned on;

DESCRIPTION OF THE PREFERRED EMBODIMENTS

Figure 1:
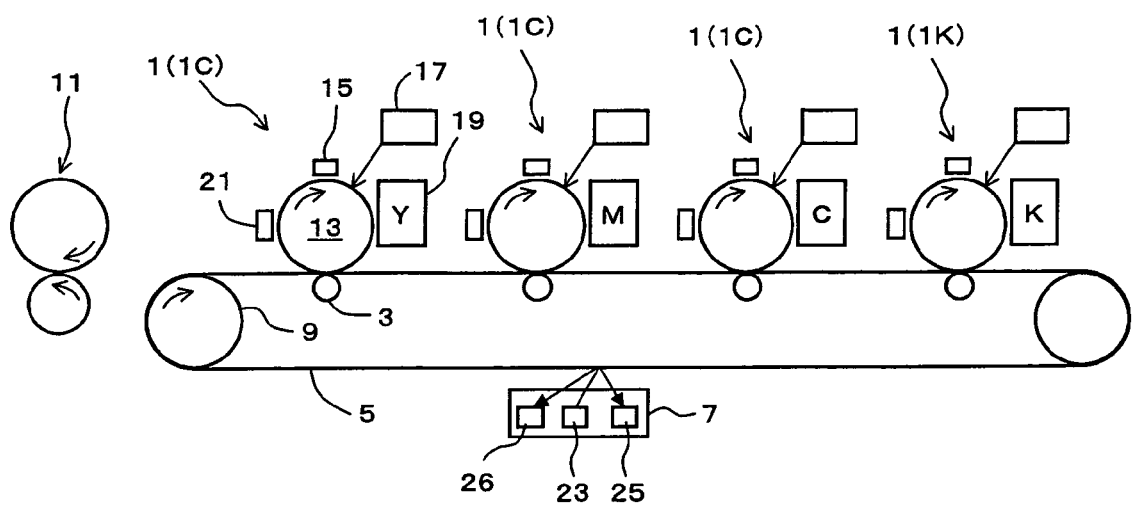
FIG. 1 is a schematic structural view of an image forming apparatus according to a first embodiment of the present invention.

An image forming apparatus according to an embodiment of the present invention includes an image forming section including a photoconductor drum, a charging device for uniformly charging the photoconductor drum, an exposure device for exposing the photoconductor drum so as to form a latent image, and a developing device for depositing toner onto the latent image using a developing roller to develop the latent image, and a manual setting mode for enabling a user to provide instruction of timing for executing a process control of the image forming section, the image forming apparatus including a cumulative operation information management section for calculating and storing cumulative operation information after the execution of the previous process control, a threshold value setting section for setting, to a threshold value, the cumulative operation information at the point when the instruction is provided in the manual setting mode, and a process control management section for executing a process control and resetting the cumulative operation information at timing when the cumulative operation information reaches the threshold value.

Preferable embodiments of the image forming apparatus according to the present invention will be exemplified below.

Preferably, the cumulative operation information includes one or more of cumulative number of printing sheets, cumulative driving time of the developing roller, cumulative revolution of the developing roller, toner consumption amount, cumulative dot count value, (cumulative number of printing sheets)×(average printing ratio), and elapsed days. Various parameters described above can be used for the cumulative operation information.

Preferably, the image forming apparatus has an automatic setting mode in which the timing is automatically set, wherein the threshold value setting section sets a predetermined value to the threshold value in the automatic setting mode. A user who does not wish to manually set the threshold value can easily set the timing for executing the process control by selecting the automatic setting mode.

Preferably, the process control management section inhibits the process control before the instruction is provided, and releases the inhibition of the process control according to the instruction. This is because, if the process control is executed before a user gives an instruction of the process control, this is inconvenient for the user who wishes to delay the timing for executing the process control.

Preferably, the process control management section determines whether the cumulative operation information reaches the threshold value or not in units of print jobs each containing contents whose image is formed by the image forming section. When the print job contains plural pages, the process control is executed before or after the printing of the print job, whereby the change of the printing quality during the printing can be avoided.

Preferably, the image forming apparatus further includes a print job determining section for determining whether the print job containing contents whose image is formed by the image forming section contains a color page or not so as to determine whether the print job is a color job or a monochrome job, wherein the image forming section includes a black image forming section used for both of color image formation and monochrome image formation, and a color image forming section used for the color image formation, the cumulative operation information management section calculates and stores the cumulative operation information in such a way the cumulative operation information is classified into monochrome cumulative operation information and color cumulative operation information in accordance with the determination at the print job determining section, the threshold value setting section sets, to a monochrome threshold value, the monochrome cumulative operation information at the point when the instruction of the process control in the monochrome mode is provided, and sets, to a color threshold value, the color cumulative operation information at the point when the instruction of the process control in the color mode is provided, and the process control management section executes the process control for the black image forming section and resets the monochrome cumulative operation information at timing when the monochrome cumulative operation information reaches the monochrome threshold value, and the process control management section executes the process control for the black image forming section and the color image forming section and resets the monochrome cumulative operation information and the color cumulative operation information at timing when the color cumulative operation information reaches the color threshold value.

In this case, a user can set the timing for executing the process control independently for the monochrome printing and the color printing, whereby the timing for executing the process control can be made more appropriate.

Preferably, the image forming apparatus has an automatic setting mode in which the timing is automatically set, wherein the threshold value setting section sets a monochrome predetermined value to the monochrome threshold value, and sets a color predetermined value to the color threshold value in the automatic setting mode. A user who does not wish to manually set the threshold value can easily set the timing for executing the process control by selecting the automatic setting mode.

Preferably, the image forming apparatus further includes a print job determining section for determining whether the print job containing contents whose image is formed by the image forming section contains a color page or not, and whether the print job contains a photograph page or not, so as to determine whether the print job is a monochrome text job, a monochrome photograph job, a color text job or a color photograph job, wherein the image forming section includes a black image forming section used for both of color image formation and monochrome image formation, and a color image forming section used for the color image formation, the cumulative operation information management section calculates and stores the cumulative operation information in such a way that the cumulative operation information is classified into monochrome cumulative operation information and color cumulative operation information in accordance with the determination at the print job determining section, the threshold value setting section sets, to a monochrome text threshold value, the monochrome cumulative operation information at the point when the instruction of the process control in the monochrome text mode is provided, sets, to a monochrome photograph threshold value, the monochrome cumulative operation information at the point when the instruction of the process control in the monochrome photograph mode is provided, sets, to a color text threshold value, the color cumulative operation information at the point when the instruction of the process control in the color text mode is provided, and sets, to a color photograph threshold value, the color cumulative operation information at the point when the instruction of the process control in the color photograph mode is provided, and the process control management section executes the process control for the black image forming section and resets the monochrome cumulative operation information at timing when the monochrome cumulative operation information reaches the monochrome text threshold value or at timing when the monochrome cumulative operation information reaches the monochrome photograph threshold value in case the print job is the monochrome photograph job, and the process control management section executes the process control for the black image forming section and the color image forming section and resets the monochrome cumulative operation information and the color cumulative operation information at timing when the color cumulative operation information reaches the color text threshold value or at timing when the color cumulative operation information reaches the color photograph threshold value in case the print job is the color photograph job.

In this case, a user can set the timing for executing the process control independently for the monochrome text mode, monochrome photograph mode, color text mode, and color photograph mode, whereby the timing for executing the process control can be made more appropriate.

Preferably, the image forming apparatus has an automatic setting mode in which the timing is automatically set, wherein the threshold value setting section sets a monochrome text predetermined value to the monochrome text threshold value, sets a monochrome photograph predetermined value to the monochrome photograph threshold value, sets a color text predetermined value to the color text threshold value, and sets a color photograph predetermined value to the color photograph threshold value in the automatic setting mode. A user who does not wish to manually set the threshold value can easily set the timing for executing the process control by selecting the automatic setting mode.

Preferably, an inequality of (monochrome text predetermined value)>(monochrome photograph predetermined value)>(color text predetermined value)>(color photograph predetermined value) is established. By virtue of this setting, the timing for executing the process control is advanced in such a manner of (monochrome text mode)<(monochrome photograph mode)<(color text mode)<(color photograph mode), which agrees with the order of the printing definition generally required. Therefore, the timing for executing the process control can be made more appropriate.

Preferably, the process control management section executes the process control only for the black image forming section upon start of the image forming apparatus. For a user who mainly uses a monochrome printing, the execution of the process control for the color image forming section every time the image forming apparatus is started brings the toner consumption and reduction in job efficiency. According to the embodiment of the invention, the inconvenience described above can be avoided.

Preferably, the print job determining section determines a page in which a color pixel ratio calculated from an equation of (color pixel number)÷(color-plus-black pixel number) is not less than a predetermined value (e.g., 30%), as a color page for each page in the print job. In this case, the determination as to whether the color pages are contained in the print job can easily be done.

Preferably, the print job determining section determines a page in which a printing ratio calculated from an equation of (color-plus-black pixel number)÷(total pixel number) is not less than a predetermined value (e.g., 30%), as a photograph page for each page in the print job. In this case, the determination as to whether the photograph pages are contained in the print job can easily be done.

The various embodiments described above can be combined to each other.

One embodiment of the present invention will be explained below with reference to the drawings. The illustration in the figures and the following description are only illustrative, and the scope of the present invention is not limited to those illustrated in the drawings and the in the following description.

1. First Embodiment

Firstly, a configuration of an essential part of an image forming apparatus according to a first embodiment of the present invention will be explained with reference to FIG. 1. A copier, laser printer, facsimile, etc. that performs an image formation with an electrophotographic system is included in the image forming apparatus according to the present embodiment.

The image forming apparatus according to the present embodiment includes image forming sections 1 for yellow (Y), magenta (M), cyan (C) and black (K), transfer rollers 3 provided for every image forming section 1, a transfer belt 5 provided between the image forming sections 1 and the transfer rollers 3, a density measuring unit 7 provided in proximity to the transfer belt 5, a belt drive roller 9 for driving the transfer belt 5, a fixing device 11, and a control section 12 for controlling these components. The black image forming section 1 is used for both monochrome printing and color printing, while the image forming sections 1 for yellow, magenta, and cyan are used for the color printing. The black image forming section 1 is referred to as "black image forming section 1K", while the image forming sections 1 for yellow, magenta, and cyan are referred to as "color image forming section 1C".

The image forming apparatus according to the present embodiment includes a manual setting mode for enabling a user to provide instruction of timing for executing a process control of the image forming sections 1, and further includes a cumulative operation information management section for calculating and storing cumulative operation information after the execution of the previous process control, a threshold value setting section for setting the cumulative operation information at the point when the instruction is provided in the manual setting mode to a threshold value, a process control management section for executing a process control at timing when the cumulative operation information reaches the threshold value, and resets the cumulative operation information, and a print job determining section for determining whether a print job including contents whose image is formed by the image forming sections 1 contains a color page or not and determines whether the print job contains a photograph page or not, in order to determine which one of a monochrome text job, a monochrome photograph job, a color text job, and a color photograph job the print job is.

The cumulative operation information management section, the threshold value setting section, the process control management section, and the print job determining section are realized by the control section 12 executing necessary processing. The control section 12 is realized by the execution of the program stored in the ROM by the CPU. The print job may be the one taken in the image forming apparatus according to the present embodiment through a communication line, and if a scanner is attached, the print job may be the one taken in the image forming apparatus according to the present embodiment through the scanner.

Each of the image forming sections 1 includes a photoconductor drum 13, a charging device 15, an exposure device 17, a developing device 19, and a cleaning device 21. The charging device 15 is configured to uniformly charge the photoconductor drum 13. The exposure device 17 has a laser diode, and it is configured to irradiate laser beam to the photoconductor drum 13 and neutralize the portion where toner should be deposited, so as to form a latent image. The developing device 19 stores toner of yellow, magenta, cyan, or black, and is configured to develop the latent image by depositing the toner onto the latent image by means of a developing roller for forming a toner pattern on the photoconductor drum 13. The toner pattern on the photoconductor drum 13 is transferred, by the transfer roller 3, onto a recording sheet transported by the transfer belt 5 or onto the transfer belt 5. The cleaning device 21 is configured to remove residual toner on the surface of the photoconductor drum 13 after the transfer.

The toner pattern transferred onto the recording sheet is fixed by being heated and fused at the fixing device 11. The toners deposited onto the transfer belt 5 and charges accumulated on the transfer belt 5 are removed by a cleaning member or a neutralization member. Here, the case in which the toner pattern on the photoconductor drum 13 is directly transferred onto the recording sheet is taken as an example. However, the description here is basically applicable to the embodiment in which the toner pattern on the photoconductor drum 13 is transferred onto an intermediate belt, and the toner pattern on the intermediate transfer belt is transferred onto a recording sheet.

The density measuring unit 7 has a light-emitting element 23 for irradiating light toward the transfer belt 5, a regular-reflecting light-receiving element 25 that receives light regularly reflected by the toner pattern transferred onto the transfer belt 5 and outputs a voltage according to a quantity of the received light, and an irregularly-reflecting light-receiving element 26 that receives light irregularly reflected by the toner pattern and outputs a voltage according to a quantity of the received light. Here, the explanation is made by taking, as an example, the case in which light is irradiated to the toner pattern on the transfer belt 5. However, the explanation here is basically applicable to the embodiment in which light is irradiated to the toner pattern on the photoconductor drum 13.

Upon a color printing, both of the color image forming section 1C and the black image forming section 1K are used. Upon a monochrome printing, the transfer belt 5 retreats so as to form a gap between the transfer belt 5 and the color image forming section 1C, whereby only the black image forming section 1K is used.

The detailed operation of the image forming apparatus according to the present invention will be explained.

1-1. Process Upon Turning on Power Supply

Figure 2:
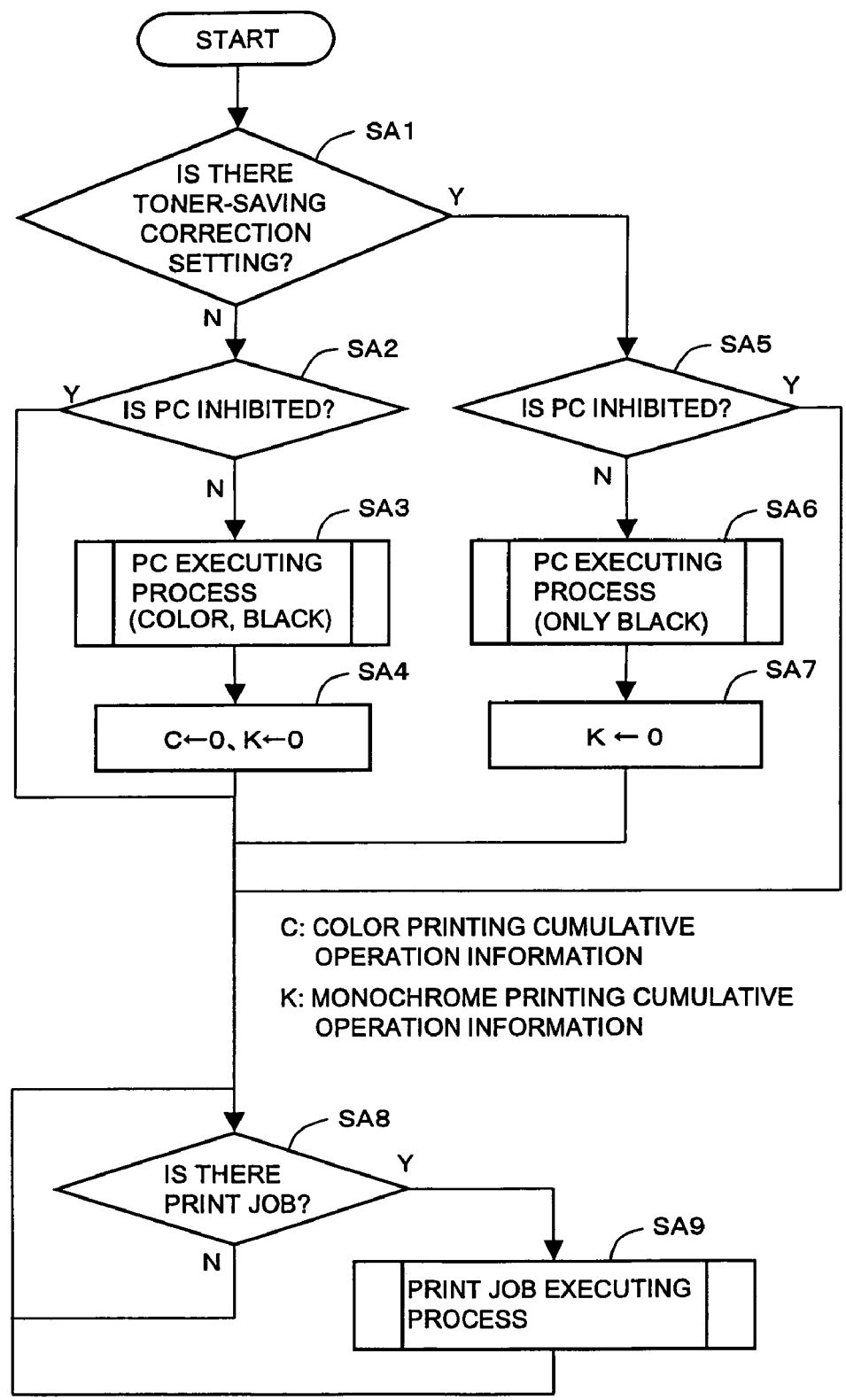

Firstly, a process when a power supply of the image forming apparatus according to the present invention is turned on will be explained with reference to the flowchart shown in FIG. 2.

When the power supply is turned ON, the control section 12 of the image forming apparatus according to the present embodiment confirms whether a toner-saving correction setting is ON or not (step SA1). When the toner-saving correction setting is OFF (N at step SA1), and process controls for a color text mode and a color photograph mode are not inhibited (N at step SA2), the control section 12 executes process controls of the color image forming section 1C and the black image forming section 1K (step SA3), and then, resets color printing cumulative operation information C and monochrome printing cumulative operation information K to zero (step SA4). The detail of the process for executing the process control will be described later. A user can optionally set the inhibition of the process control for each of the color text mode, color photograph mode, monochrome text mode and monochrome photograph mode. The color text mode, color photograph mode, monochrome text mode and monochrome photograph mode correspond respectively to color text printing, color photograph printing, monochrome text printing and monochrome photograph printing.

The color printing cumulative operation information C is cumulative operation information relating to a color printing, while the monochrome printing cumulative operation information K is cumulative operation information relating to a monochrome printing. The cumulative operation information indicates to what degree the image forming apparatus has executed the color printing or monochrome printing. Examples of the cumulative operation information include a cumulative number of printing sheets, cumulative driving time of the developing roller at the developing device 19, cumulative revolution of the developing roller at the developing device 19, toner consumption amount, cumulative dot count value, (cumulative number of printing sheets)×(average printing ratio), or elapsed days. The explanation is made taking, as an example, the case in which the cumulative operation information is the cumulative number of printing sheets. However, this explanation is basically applicable to the cases other than the case in which the cumulative operation information is the cumulative number of printing sheets.

When the toner-saving correction setting is ON (Y at step SA1), and process controls for the monochrome text mode and the monochrome photograph mode are not inhibited (N at step SA5), the control section 12 executes only the process control for the black image forming section 1K (step SA6), and then, resets the monochrome printing cumulative operation information K to zero (step SA7).

When the process control is inhibited (Y at step SA2, Y at step SA5) or the process at step SA4 or SA7 is completed, the control section 12 then confirms whether a print job is present or not (step SA8). When the print job is present (Y at step SA8), the control section 12 performs a print job executing process (step SA9). The detail of the print job executing process will be described later.

When the print job is not present (N at step SA8) or after the print job executing process (step SA9) is completed, the control section 12 returns to step SA8 to continue the process. When the power supply is turned OFF, the image forming apparatus according to the present embodiment ends the operation.

1-2. Process Control Executing Process

Subsequently, the process control executing process at step SA3 or SA6 will be explained with reference to the flowchart shown in FIG. 3. According to the process control executing process, various image forming conditions relating to the image forming section 1 is adjusted by the control section 12. In the present embodiment, the process control is composed of a high-density correction (steps SB1 to SB5) and tone correction (steps SB7 to SB10). Here, the tone correction is executed only when the variation amount of the developing bias voltage by the high-density correction exceeds a threshold value, but it may be executed for every process control. The explanation is made here taking, as an example, the case in which the process control for the black image forming section 1K is executed. However, the process control executing process can be executed in the same manner for the color image forming section 1C. One example of methods and conditions for executing the process control is shown here, but the methods and conditions for executing the process control are not limited thereto.

(1) High-density Correction (steps SB1 to SB5)

The method of the high-density correction will firstly be explained.

Firstly, the photoconductor drum 13 is charged, exposed and developed to form a toner pattern for forming high-density correction test patches A to C on the photoconductor drum 13. This toner pattern is transferred onto the transfer belt 5 so as to form the high-density correction test patches A to C (step SB1).

The photoconductor drum 13 is charged with a grid voltage of the charging device 15 set to Vg. The grid voltage Vg is the value of the grid voltage set when the process control is previously executed. The initial value of the grid voltage is −600 V, and this value may be changed at the later-described step SB5. The exposure is made with the duty ratio of the laser diode of the exposure device 17 set to 100% (i.e., continuous driving). The development is carried out with the developing bias voltage of the developing device 19 changed. The toner patterns for the test patches A to C are formed by development with the developing bias voltages set to Vbp−50, Vbp, and Vbp+50. The Vbp is the value of the developing bias voltage set when the process control is previously executed. The initial value of the developing bias voltage is −325, and this value can be changed to an optimum value at the later-described step SB3.

Figure 4A:
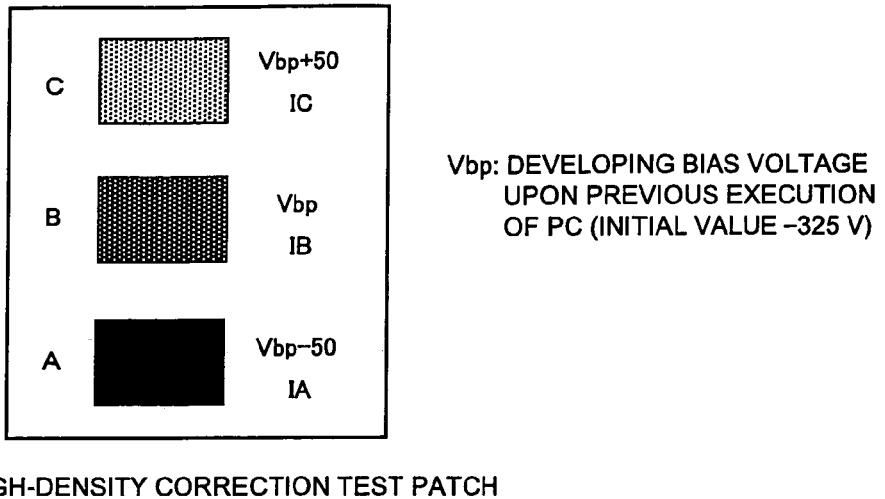
FIG. 4A is a figure used for explanation of the first embodiment of the present invention, and shows appearances of high-density correction test patches A to C.

The appearances of the test patches A to C are shown in FIG. 4A. FIG. 4A shows the state in which the amount of the deposited toner is greater as the value of the developing bias is smaller (as the absolute value in the negative direction is greater).

Next, the reflection-light intensities IA, IB, and IC of the test patches A to C are measured (step SB2). The reflection-light intensity can be measured as follows. Specifically, light is irradiated from the light-emitting element 23 toward the test patches A to C on the transfer belt 5, the light regularly or irregularly reflected by the test patches A to C is received by the regularly-reflecting light receiving element 25 or the irregularly-reflecting light receiving element 26, and the reflection-light intensity can be measured on the basis of the magnitude of the voltage generated at the regularly-reflecting light receiving element 25 or the irregularly-reflecting light receiving element 26.

As for black, the densities of the test patches A to C are evaluated on the basis of the intensity of the regularly-reflecting light, while the densities of the test patches A to C for the other colors are evaluated on the basis of the intensity of the irregularly-reflecting light, in general. Since the quantity of light of the irregularly-reflecting light increases while the quantity of light of the regularly-reflecting light decreases as the amount of deposited toner increases, the magnitude of the voltage generated at the regularly-reflecting light receiving element 25 or the irregularly-reflecting light receiving element 26 is correlated with the densities of the test patches A to C. The explanation is made here taking, as an example, the case in which the intensity of reflection light is the intensity of the regularly reflecting light.

Figure 4B:
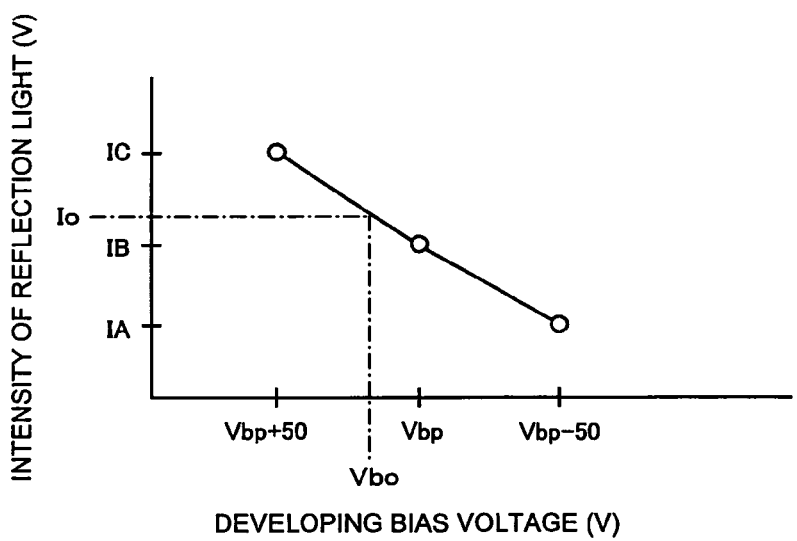
FIG. 4B is a figure used for explanation of the first embodiment of the present invention, and is a graph showing relationship between a developing bias voltage upon forming the test patches A to C and intensities IA, IB, and IC of reflection light measured at step SB2.

FIG. 4B is a graph indicating the relationship between the developing bias voltage upon forming the test patches A to C and the intensities IA, IB, and IC of the reflection light measured at step SB2. FIG. 4B shows three measured data pieces corresponding to the test patches A to C and a straight line linking adjacent two data pieces among three measured data pieces.

Next, the developing bias voltage Vbo at which the intensity of the reflection light becomes a reference value Io by the method shown in FIG. 4B (step SB3).

Subsequently, the absolute value of the difference between the grid voltage Vg and the developing bias voltage Vbo calculated at step SB3 is obtained, and it is determined whether this absolute value is smaller than 150 V or not (step SB4). When the absolute value is smaller than 150 V (Y at step SB4), Vg is set to Vbo−150 V so as to prevent the deposition of toner onto a base (so-called fogging) (step SB5), and then, the program proceeds to step SB6. When the absolute value is not less than 150 V (N at step SB4), the program proceeds to SB6.

Next, it is determined whether or not the variation amount (|Vbp−Vbo|) of the developing bias voltage by the high-density correction at steps SB1 to SB5 exceeds a threshold value (ΔVbmax) of the variation amount (step SB6). When it exceeds the threshold value (Y at step SB6), a tone correction is executed, while when it does not exceed the threshold value (N at step SB6), the process control executing process is ended without executing the tone correction. The threshold value of the variation amount may be different from each color. For example, the threshold value for black may be set greater than the threshold values for the other colors. This is because a high precise printing is rather demanded for the color printing than for the monochrome printing, in general.

(2) Tone Correction (steps SB7 to SB10)

Subsequently, the method for executing the tone correction will be explained.

Firstly, the photoconductor drum 13 is charged, exposed and developed to form a toner pattern for forming tone correction test patches 1 to 16 on the photoconductor drum 13. This toner pattern is transferred onto the transfer belt 5 so as to form the tone correction test patches 1 to 16 (step SB7).

The photoconductor drum 13 is charged with the grid voltage of the charging device 15 set to Vg. When the value of the grid voltage Vg is changed at step SB5, the charging is made with the changed value. The exposure is done in such a manner that the duty ratio of the laser diode of the exposure device 17 is set so as to become values corresponding to input tone values D1 to D16. For example, D1 to D16 are 255, 239, 223, 207, 191, 175, 159, 143, 127, 111, 95, 79, 63, 47, 31 and 15, respectively. The laser duty ratio corresponding to the input tone value is obtained by referring to a tone correction table in which the input tone value and the laser duty ratio are associated with each other. The tone correction table created at the time of the previous tone correction is used, but at the first tone correction, a default tone correction table installed to a device at the time of shipment is used. The development is performed with the developing bias Vbo calculated at step SB3.

Figure 5A:
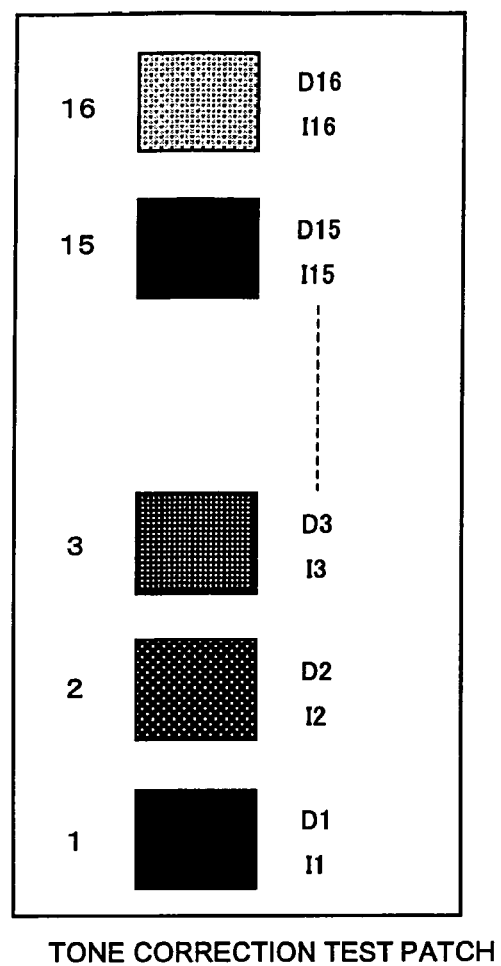
FIG. 5A is a figure used for explanation of the first embodiment of the present invention, and shows appearances of tone correction test patches 1 to 16.

The appearances of the test patches 1 to 16 are indicated in FIG. 5A. FIG. 5A shows the state in which the amount of deposited toner increases, as the input tone value increases.

Next, the intensities I1 to I16 of the reflection light of the test patches 1 to 16 are measured (step SB8). The intensities I1 to I16 of the reflection light are measured by the same manner as in the high-density correction.

Figure 5B:
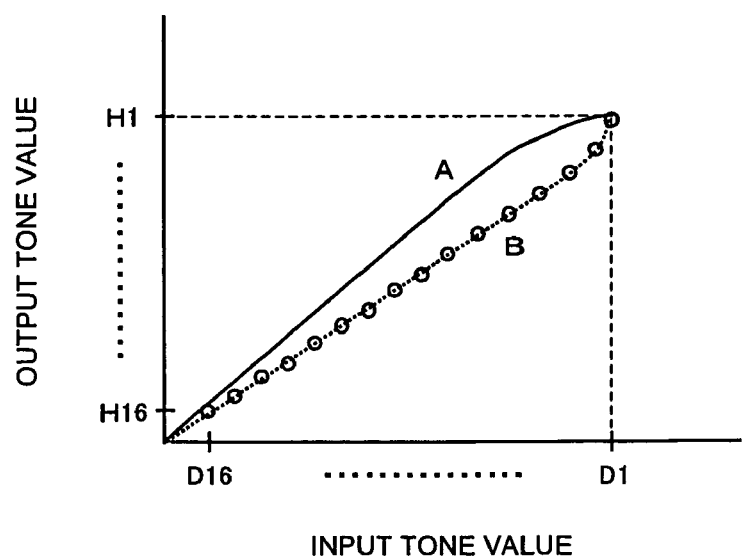
FIG. 5B is a figure used for explanation of the first embodiment of the present invention, and is a graph showing a relationship between input tone values D1 to D16 corresponding to the test patches 1 to 16 and output tone values H1 to H16 obtained on the basis of intensities I1 to I16 of reflection light.

FIG. 5B is a graph showing the relationship between the input tone values D1 to D16 corresponding to the test patches 1 to 16 and output tone values H1 to H16 obtained on the basis of the intensities I1 to I16 of the reflection light. FIG. 5B shows sixteen measured data pieces corresponding to the test patches 1 to 16, a curve B obtained from the sixteen measured data pieces with the least square method, and an ideal curve A indicating an ideal relationship between the input tone values and the output tone values.

It is ideal that the relationship between the input tone values and the output tone values takes the ideal curve A (accordingly, the tone correction table is created at the time of the previous tone correction such that the relationship between the input tone values and the output tone values becomes the ideal curve A). However, the relationship between the input tone values and the output tone values becomes, for example, the curve B that is shifted from the curve A due to the factors such as environmental change or time-course deterioration. Therefore, the laser duty ratio by which the relationship between the input tone values and the output tone values coincides with the ideal curve A is obtained for each input tone value, whereby the tone correction table in which the input tone values and the laser duty ratios are associated with each other is newly created (step SB9).

Then, the developing bias voltage Vbo is stored as Vbp (step SB10), the tone correction process is ended, and the process control executing process is ended. At the time of the next high-density correction, the test patches A to C are formed with the developing bias voltages of Vbp−50, Vbp, and Vbp+50 (refer to step SB1).

1-3. Print Job Executing Process

Figure 6:
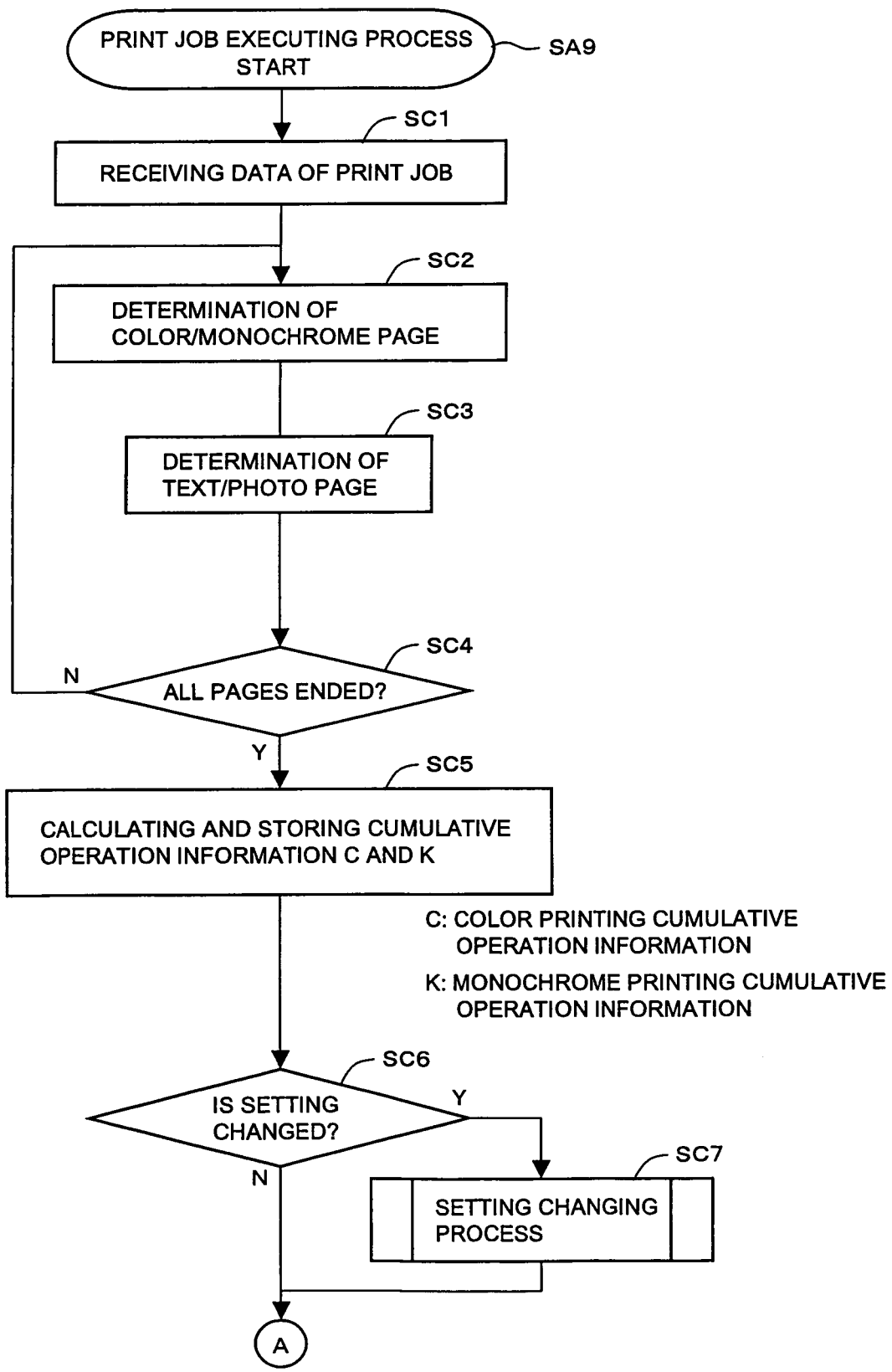
FIG. 6 is a flowchart showing a flow of a print job executing process in the image forming apparatus according to the first embodiment of the present invention.
Figure 7:
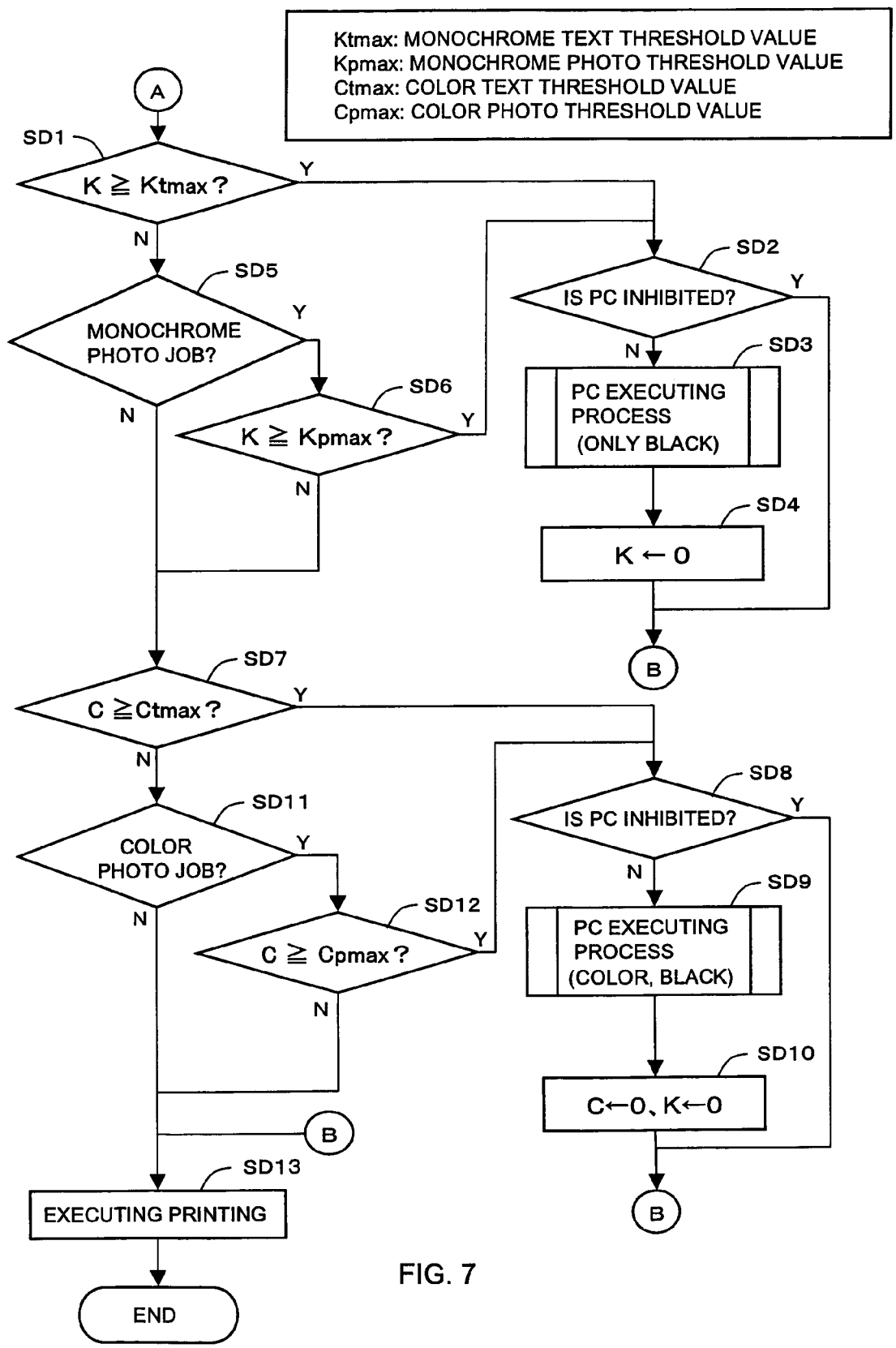
FIG. 7 is a flowchart showing a flow of a print job executing process in the image forming apparatus according to the first embodiment of the present invention.

Subsequently, the print job executing process at step SA9 will be explained with reference to flowcharts in FIGS. 6 and 7.

Firstly, when the control section 12 receives data of the print job (step SC1), it determines whether the first page of this print job is a color page or a monochrome page (step SC2). This determination is made as follows. Specifically, the colored ratio in one page is obtained by (color pixel numbers)÷(color-plus-black pixel numbers). "Color pixel numbers" mean the total of the pixel numbers of yellow, magenta, and cyan, and "color-plus-black pixel numbers" mean the total of the pixel numbers of yellow, magenta, cyan, and black. The page having the colored ratio of less than 30% is determined to be a monochrome page, and the page having the colored ratio of not less than 30% is determined to be a color page.

Next, the control section 12 determines whether the first page of the print job is a text page or a photograph page (step SC3). This determination is made as follows. Specifically, the printing ratio in one page is obtained by (color-plus-black pixel numbers)÷(total pixel numbers), whereby the page having the printing ratio of less than 30% is determined to be a text page, and the page having the printing ratio of not less than 30% is determined to be a photograph page.

Subsequently, the control section 12 confirms that the determinations at steps SC2 and SC3 are completed for all pages of the print job (step SC4). When they are not completed (N at step SC4), the program returns to step SC2 so as to make the determinations at steps SC2 and SC3 for the next page. When they are completed (Y at step SC4), the program proceeds to step SC5.

The control section 12 determines which one the print job is, i.e., a monochrome text job, a monochrome photograph job, a color text job, or a color photograph job, on the basis of the result of the determinations at steps SC2 and SC3. The color photograph job means a job having at least one color photograph page. The color text job is a job having at least one color text page and not having a color photograph page. The monochrome photograph job is a job having at least one monochrome photograph page and not having a color page. The monochrome text job is a job made of only monochrome text page.

Next, the control section 12 classifies the cumulative operation information after the execution of the previous process control into the monochrome cumulative operation information K and color cumulative operation information C on the basis of the result of the determinations at steps SC2 and SC3, and stores them (step SC5). For example, when the cumulative operation information is the cumulative number of printing sheets, and the print job this time is a monochrome text job or a monochrome photograph job, the monochrome cumulative operation information can be calculated by adding the number of pages of the print job this time to the monochrome cumulative number of printing sheets up to the previous execution of the process control. When the print job this time is a color text job or a color photograph job, the color cumulative operation information can be calculated by adding the number of pages of the print job this time to the color cumulative number of printing sheets up to the previous execution of the process control.

Next, the control section 12 confirms whether the setting for executing the process control is changed or not (step SC6). When the setting is changed (Y at step SC6), the setting changing process is carried out (step SC7). The detail of the setting changing process will be described later. When the setting is not changed (N at step SC6), the program proceeds to step SD1 in FIG. 7.

Subsequently, the control section 12 confirms whether the monochrome printing cumulative operation information K is not less than a monochrome text threshold value Ktmax (K≧Ktmax) or not (step SD1). The monochrome threshold value Ktmax is a default value or is manually or automatically set in the setting changing process in FIG. 8. The same is true for a monochrome photograph threshold value Kpmax, color text threshold value Ctmax, and color photograph threshold value Cpmax described later.

When K≧Ktmax (Y at step SD1) and the process control in the monochrome text mode is not inhibited (N at step SD2), the control section 12 performs the process control for the black image forming section 1K (step SD3), resets the monochrome printing cumulative operation information K to zero (step SD4), and then, proceeds to step SD13. The process control executing process can be carried out by the method shown in FIG. 3.

Figure 3:
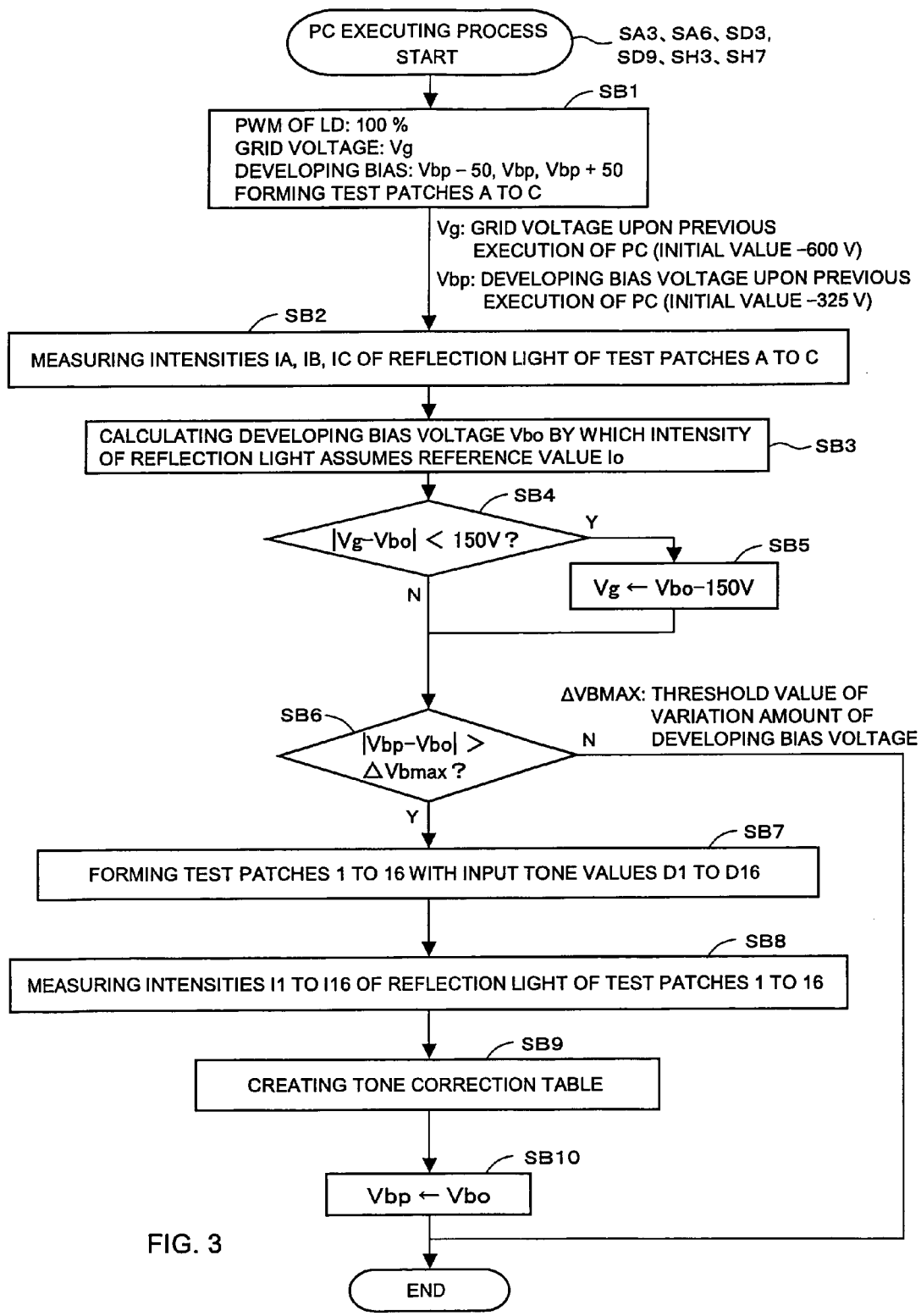
FIG. 3 is a flowchart showing a flow of a process control executing process of the image forming apparatus according to the first embodiment of the present invention.

In the flowchart shown in FIG. 3 may be provided a step in which the monochrome text threshold value Ktmax is increased (e.g., by a factor of 1.2) when the variation amount (|Vbp−Vbo|) of the developing bias voltage by the high-density correction is not more than the reference value. The variation amount not more than the reference value means that the timing for executing the process control is too early.

Accordingly, by providing the step described above, the process control can be executed at more appropriate timing. The same is true for the other threshold values (e.g., monochrome photograph threshold value Kpmax, color text threshold value Ctmax, and color photograph threshold value Cpmax, described later).

When the process control in the monochrome text mode is inhibited Y at step SD2), the control section 12 proceeds directly to step SD13.

Next, when K<Ktmax (N at step SD1) and the print job is the monochrome photograph job (Y at step SD5), the control section 12 confirms whether the monochrome printing cumulative operation information K is not less than the monochrome photograph threshold value Kpmax (K≧Kpmax) or not (step SD6). When K≧Kpmax (Y at step SD6), the control section 12 performs processes at steps SD2 to SD4 by the same manner described above. In this case, at step SD2, the control section 12 determines whether the process control in the monochrome photograph mode is inhibited or not.

According to the present embodiment, when the print job is the monochrome photograph job, the process control is executed in case where the condition of K≧Kpmax is satisfied, too. Therefore, a user who wishes to execute the process control at an earlier timing in case where the print job is a monochrome photograph job than that in case where the print job is a monochrome text job can execute the process control at relatively early timing in case where the print job is a monochrome photograph job, by setting Kpmax<Ktmax.

Next, the control section 12 confirms whether the color printing cumulative operation information C is not less than a color text threshold value Ctmax (C≧Ctmax) or not (step SD7). When C≧Ctmax (Y at step SD7) and the process control in the color text mode is not inhibited (N at step SD8), the control section 12 executes the process control for the black image forming section 1K and the color image forming section 1C (step SD9), resets the monochrome printing cumulative operation information K and the color printing cumulative operation information C to zero (step SD10), and then, proceeds to step SD13. The process control executing process can be carried out by the method shown in FIG. 3. When the process control in the color text mode is inhibited (Y at step SD8), the control section 12 directly proceeds to step SD13.

In the present embodiment, the monochrome printing cumulative operation information K and the color printing cumulative operation information C are independently calculated so as to independently set the timing for executing the process control for the monochrome printing and the color printing. Accordingly, a user can reduce the frequency of the process control for the color image forming section 1C when the user mainly performs the monochrome printing, for example. Consequently, the toner consumption at the color image forming section 1C can be suppressed, and further, the reduction in the job efficiency due to the process control can be prevented.

Subsequently, when C<Ctmax (N at step SD7) and the print job is a color photograph job (Y at step SD11), the control section 12 confirms whether the color printing cumulative operation information C is not less than a color photograph threshold value Cpmax (C≧Cpmax) or not (step SD12). When C≧Cpmax (Y at step SD12), the control section 12 performs processes at steps SD8 to SD1 by the same manner described above. In this case, at step SD8, the control section 12 determines whether the process control in the color photograph mode is inhibited or not.

According to the present embodiment, when the print job is the color photograph job, the process control is executed in case where the condition of C≧Cpmax is satisfied, too. Therefore, a user who wishes to execute the process control at an earlier timing in case where the print job is a color photograph job than that in case where the print job is a color text job can execute the process control at relatively early timing in case where the print job is a color photograph job, by setting Cpmax<Ctmax.

Next, the control section 12 executes the printing of the print job at step SD13 so as to complete the print job executing process. The print job can be printed in such a manner that a toner pattern corresponding to contents of the print job is formed on the photoconductor drum 13 by executing the charging, exposure, and development to the photoconductor drum 13, and this toner pattern is transferred and fixed onto a recording sheet.

1-4. Setting Changing Process

Figure 8:
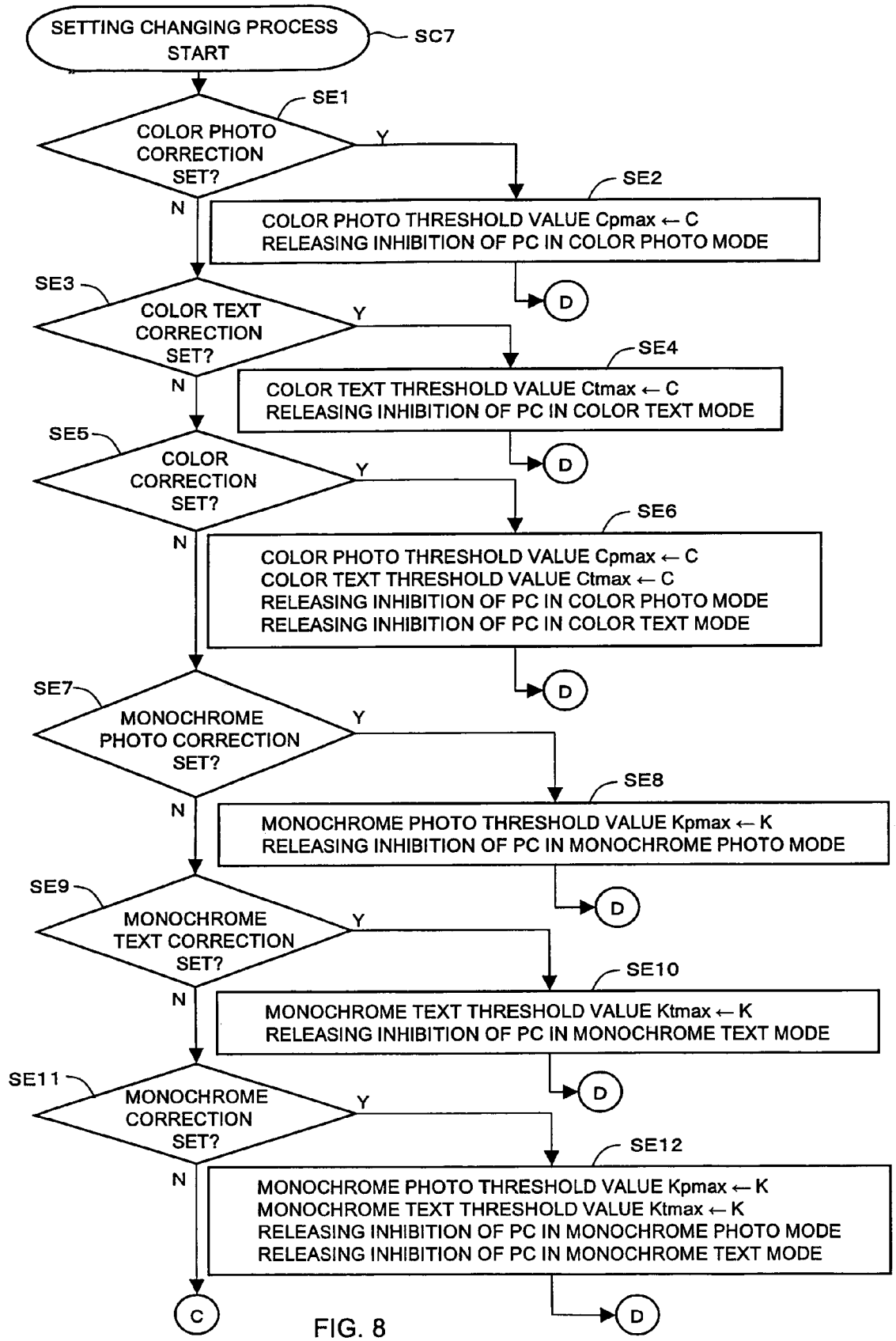
FIG. 8 is a flowchart showing a flow of a setting changing process in the image forming apparatus according to the first embodiment of the present invention.
Figure 9:
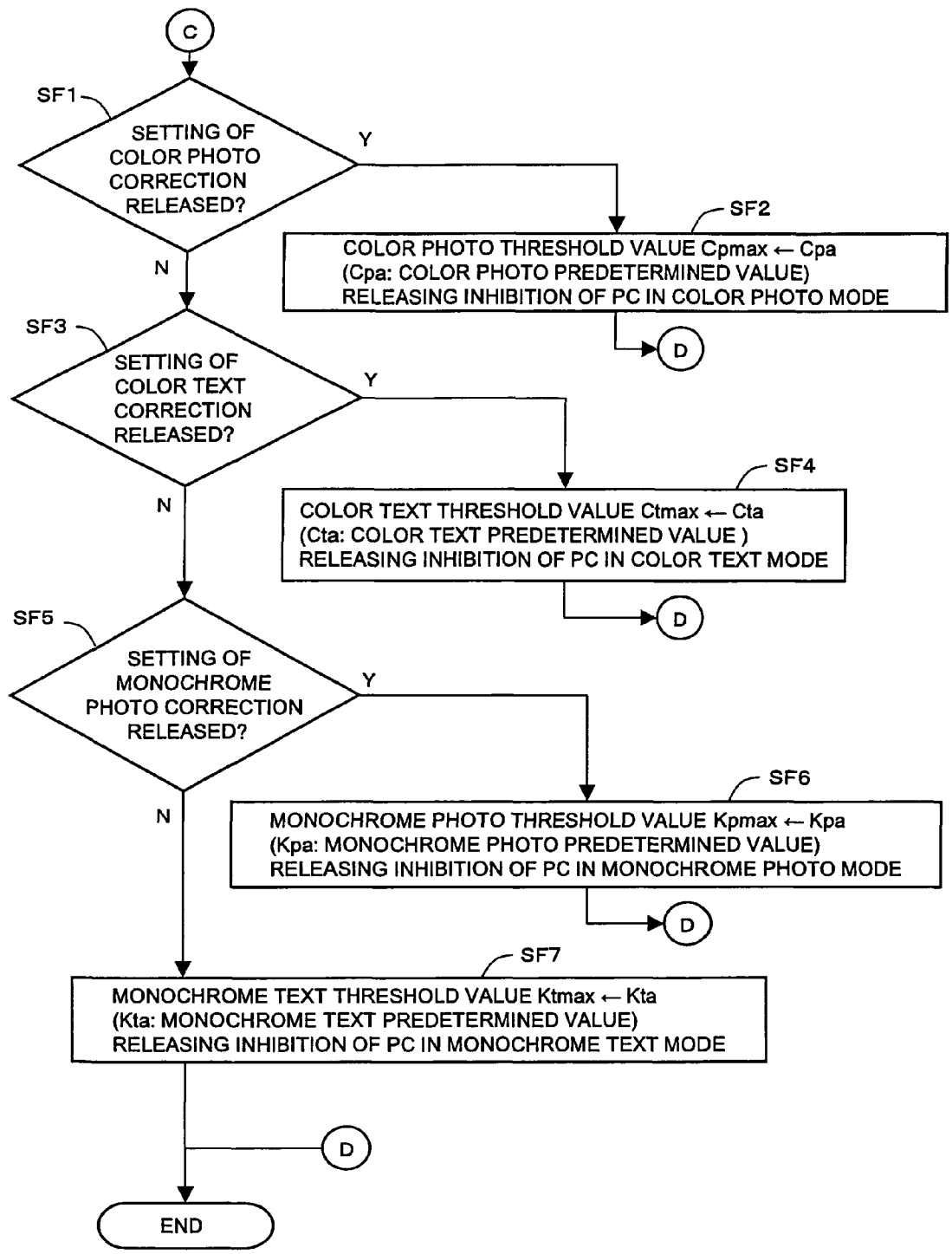
FIG. 9 is a flowchart showing a flow of a setting changing process in the image forming apparatus according to the first embodiment of the present invention.

Subsequently, the setting changing process at step SC7 in FIG. 6 will be explained with reference to the flowcharts shown in FIGS. 8 and 9. Steps SE1 to SE12 are steps relating to a manual setting mode, while steps SF1 to SF7 are steps relating to an automatic setting mode. The manual setting mode is the mode in which a user designates the timing for executing the process control for the image forming section 1, while the automatic setting mode is the mode in which the timing is automatically set.

In the manual setting mode, when the control section 12 accepts the instruction from a user, the monochrome or color cumulative operation information (e.g., cumulative number of printing sheets) K or C at the present time is set to a threshold value (monochrome text threshold value Ktmax, monochrome photograph threshold value Kpmax, color text threshold value Ctmax, or color photograph threshold value Cpmax) for determining whether the process control is executed or not.

Once the threshold value is set, the process control afterwards is executed when the cumulative operation information reaches the threshold value. In general, the degree of the demand for the printing quality depends upon a user. Each user can easily set an appropriate threshold value according to his/her demand by setting the threshold value described above.

The automatic setting mode is the mode executed when the manual setting mode is not set or when the manual setting mode is canceled. In the automatic setting mode, the threshold value for determining whether the process control is executed or not is automatically set to a predetermined value.

The setting changing process will be explained below in detail.

When the color photograph correction is set (Y at step SE1), the control section 12 substitutes the value of the color printing cumulative operation information C in the color photograph threshold value Cpmax, and releases the inhibition of the process control in the color photograph mode (step SE2), thereby completing the setting changing process. By virtue of this process, the equation of C=Cpmax is established, so that the determination at step SD12 becomes Y, whereby the process control is executed at step SD9. Therefore, the setting of the color photograph correction corresponds to the instruction of the process control in the color photograph mode.

When the color text correction is set (Y at step SE3), the control section 12 substitutes the value of the color printing cumulative operation information C in the color text threshold value Ctmax, and releases the inhibition of the process control in the color text mode (step SE4), thereby completing the setting changing process. By virtue of this process, the equation of C=Ctmax is established, so that the determination at step SD7 becomes Y, whereby the process control is executed at step SD9. Therefore, the setting of the color text correction corresponds to the instruction of the process control in the color text mode.

When the color correction is set (Y at step SE5), the control section 12 substitutes the value of the color printing cumulative operation information C in both the color photograph threshold value Cpmax and the color text threshold value Ctmax, and releases the inhibition of the process control in the color photograph mode and the color text mode (step SE6), thereby completing the setting changing process. By virtue of this process, the equation of C=Ctmax=Cpmax is established, so that the determinations at step SD7 and SD12 become Y, whereby the process control is executed at step SD9. Therefore, the setting of the color correction corresponds to the instruction of the process control in the color photograph mode and the color text mode.

When the monochrome photograph correction is set (Y at step SE7), the control section 12 substitutes the value of the monochrome printing cumulative operation information K in the monochrome photograph threshold value Kpmax, and releases the inhibition of the process control in the monochrome photograph mode (step SE8), thereby completing the setting changing process. By virtue of this process, the equation of K=Kpmax is established, so that the determination at step SD6 becomes Y, whereby the process control is executed at step SD3. Therefore, the setting of the monochrome photograph correction corresponds to the instruction of the process control in the monochrome photograph mode.

When the monochrome text correction is set (Y at step SE9), the control section 12 substitutes the value of the monochrome printing cumulative operation information K in the monochrome text threshold value Ktmax, and releases the inhibition of the process control in the monochrome text mode (step SE10), thereby completing the setting changing process. By virtue of this process, the equation of K=Ktmax is established, so that the determination at step SD1 becomes Y, whereby the process control is executed at step SD3. Therefore, the setting of the monochrome text correction corresponds to the instruction of the process control in the monochrome text mode.

When the monochrome correction is set (Y at step SE11), the control section 12 substitutes the value of the monochrome printing cumulative operation information K in both the monochrome photograph threshold value Kpmax and the monochrome text threshold value Ktmax, and releases the inhibition of the process control in the monochrome photograph mode and the monochrome text mode (step SE12), thereby completing the setting changing process. By virtue of this process, the equation of K=Ktmax=Kpmax is established, so that the determinations at steps SD1 and SD6 become Y, whereby the process control is executed at step SD3. Therefore, the setting of the monochrome correction corresponds to the instruction of the process control in the monochrome photograph mode and the monochrome text mode.

When the setting of the color photograph correction is released (Y at step SF1), the control section 12 substitutes the color photograph predetermined value Cpa in the color photograph threshold value Cpmax, and the inhibition of the process control in the color photograph mode is released (step SF2), thereby completing the setting changing process. In case where a user wishes to manually set the threshold value again, the process control in the color photograph mode is again inhibited so as not to execute the process control with the predetermined value Cpa. The same is true for the process controls for the color text mode, monochrome photograph mode, and the monochrome text mode.

When the setting of the color text correction is released (Y at step SF3), the control section 12 substitutes the color text predetermined value Cta in the color text threshold value Ctmax, and the inhibition of the process control in the color text mode is released (step SF4), thereby completing the setting changing process.

When the setting of the monochrome photograph correction is released (Y at step SF5), the control section 12 substitutes the monochrome photograph predetermined value Kpa in the monochrome photograph threshold value Kpmax, and the inhibition of the process control in the monochrome photograph mode is released (step SF6), thereby completing the setting changing process.

In the case not applied to the cases described above, the control section 12 substitutes the monochrome text predetermined value Kta in the monochrome text threshold value Ktmax, and the inhibition of the process control in the monochrome text mode is released (step SF7), thereby completing the setting changing process.

It is preferable that the predetermined value is set so as to establish the inequality of (monochrome text predetermined value Kta)>(monochrome photograph predetermined value Kpa)>(color text predetermined value Cta)>(color photograph predetermined value Cpa). By virtue of this setting, the timing for executing the process control is advanced in the order of (monochrome text mode)<(monochrome photograph mode)<(color text mode)<(color photograph mode), which agrees with the order of the printing definition generally demanded. Therefore, the timing for executing the process control can be made appropriate. In one example, Kta is 1500 sheets, Kpa is 750 sheets, Cta is 400 sheets, and Cpa is 100 sheets.

2. Second Embodiment

Although an image forming apparatus according to the second embodiment of the present invention is similar to the one in the first embodiment, contents of the print job executing process at step SA9 is different. Therefore, this point will mainly be explained. The present embodiment will be explained taking, as one example, the case in which the cumulative operation information is the cumulative driving time of the developing roller in the developing device 19. This explanation is basically applicable to the case in which the cumulative operation information is other than the cumulative driving time of the developing roller.

2-1. Print Job Executing Process

Figure 10:
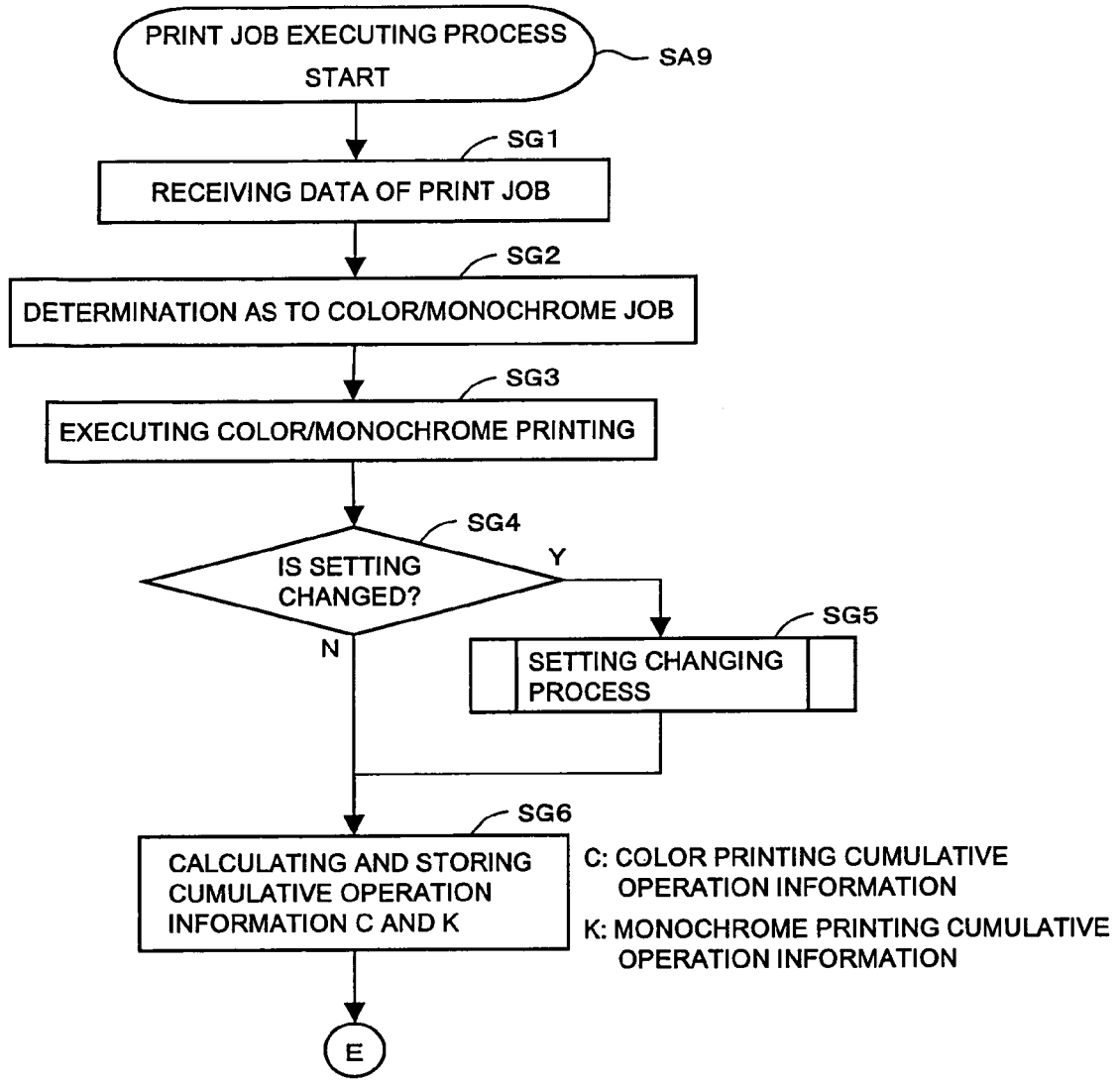
FIG. 10 is a flowchart showing a flow of a print job executing process in the image forming apparatus according to a second embodiment of the present invention.
Figure 11:
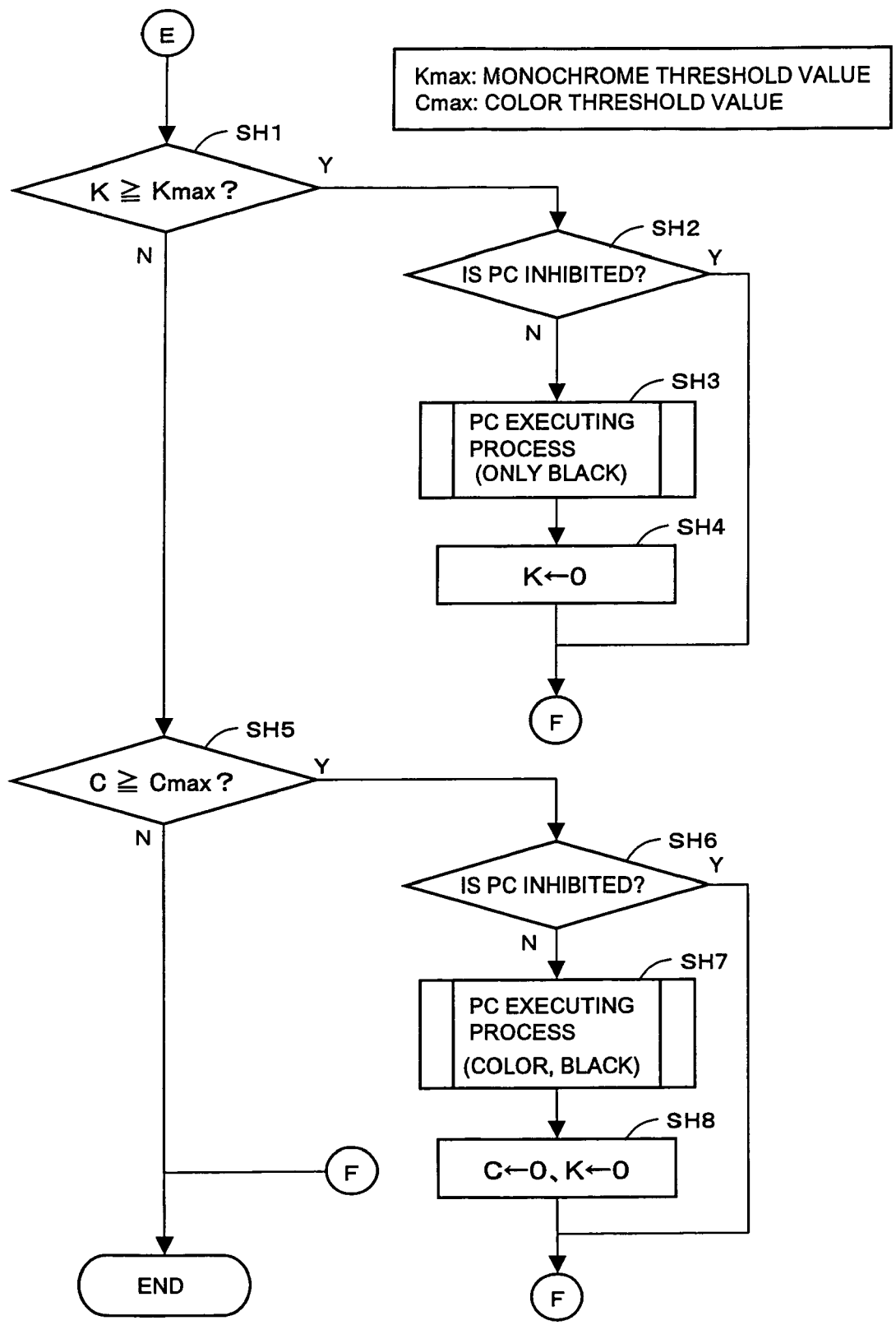
FIG. 11 is a flowchart showing a flow of a print job executing process in the image forming apparatus according to the second embodiment of the present invention.

The print job executing process at SA9 will be explained with reference to the flowcharts shown in FIGS. 10 and 11.

Firstly, when the control section 12 receives data of a print job (step SG1), it determines whether this print job is a color job or a monochrome job (step SG2). This determination may be made by the same manner as in the first embodiment, or may be made by referring to contents of the header in the data. The color job means a job containing at least one color page. The monochrome job means a job composed of only monochrome pages.

Next, the control section 12 executes the color printing or monochrome printing in accordance with the determination at step SG2 (step SG3). The printing can be made by the same manner as in the first embodiment. In the first embodiment, it is determined whether the process control is necessary or not before the execution of the printing, and if necessary, the process control is executed. On the other hand, in the present embodiment, the printing is executed before the determination as to whether the process control is necessary or not.

Subsequently, the control section 12 confirms whether the setting is changed or not about the condition for executing the process control (step SG4). When the setting is changed (Y at step SG4), the setting changing process is carried out (step SG5). The detail of the setting changing process will be described later. When the setting is not changed (N at step SG4), the control section 12 proceeds to step SG6.

Next, according to the determination of step SG2, the control section 12 classifies the cumulative operation information after the previous execution of the process control into the monochrome cumulative operation information K and the color cumulative operation information C, and stores them (step SG6).

Then, the control section 12 confirms whether the monochrome printing operation cumulative information K is not less than the monochrome threshold value Kmax (K≧Kmax) (step SH1). The monochrome threshold value Kmax is a default value or may be manually set or automatically set in the setting changing process in FIG. 12. The same is true for the later-described color threshold value Cmax.

When K≧Kmax (Y at step SH1) and the process control in the monochrome mode is not inhibited (N at step SH2), the control section 12 performs the process control for the black image forming section 1K (step SH3), resets the monochrome printing cumulative operation information K to zero (step SH4), and then, ends the print job executing process. The process control executing process can be carried out by the method shown in FIG. 3. When K<Kmax, the control section 12 proceeds to step SH5.

Then, the control section 12 confirms whether the color printing operation cumulative information C is not less than the color threshold value Cmax (C≧Cmax) (step SH5). When C≧Cmax (Y at step SH5) and the process control in the color mode is not inhibited (N at step SH6), the control section 12 performs the process control for the black image forming section 1K and the color image forming section 1C (step SH7), resets the monochrome printing cumulative operation information K and the color printing cumulative operation, information C to zero (step SH8), and then, ends the print job executing process. The process control executing process can be carried out by the method shown in FIG. 3. When C<Cmax, the control section 12 ends the print job executing process without performing any processes.

2-2. Setting Changing Process

Figure 12:
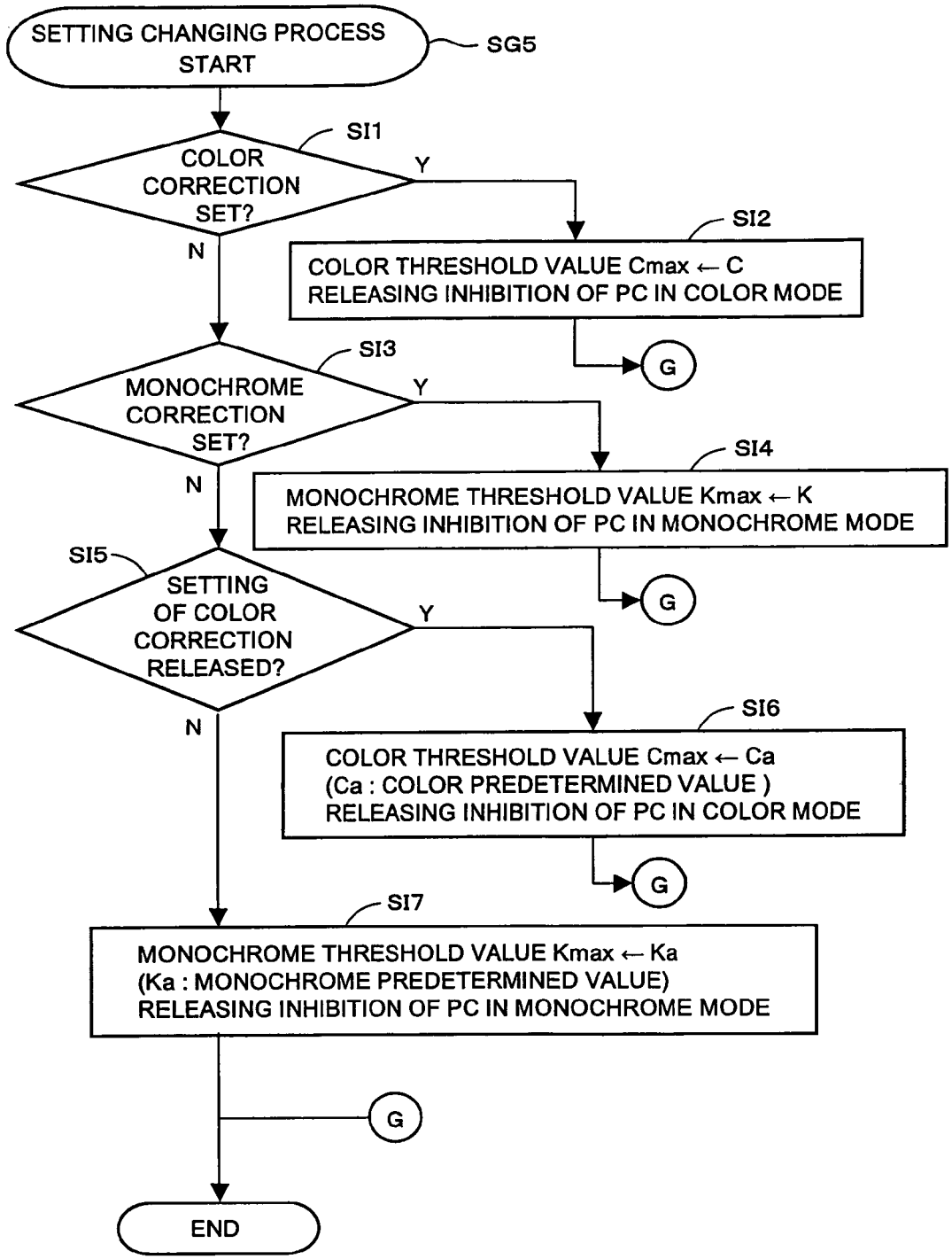
FIG. 12 is a flowchart showing a flow of a setting changing process in the image forming apparatus according to the second embodiment of the present invention.

Subsequently, the setting changing process at step SG5 in FIG. 10 will be explained with reference to the flowchart in FIG. 12. Steps SI1 to SI4 are steps relating to a manual setting mode, while steps SI5 to SI7 are steps relating to an automatic setting mode. In the first embodiment, four threshold values that are the monochrome text threshold value Ktmax, the monochrome photograph threshold value Kpmax, the color text threshold value Ctmax, and the color photograph threshold value Cpmax are set. On the other hand, in the present embodiment, two threshold values that are a monochrome threshold value Kmax and a color threshold value Cmax are set. In the present embodiment, the operation by a user and the setting changing process are simplified.

The detailed explanation is as follows.

When the color correction is set (Y at step SI1), the control section 12 substitutes the value of the color printing cumulative operation information C in the color threshold value Cmax, and the inhibition of the process control in the color mode is released (step SI2), thereby completing the setting changing process. Since the color printing cumulative operation information C is updated after the setting changing process (at step SG6), the color printing cumulative operation information C substituted in the color threshold value Cmax is the one before the update. The same is true for the monochrome printing cumulative operation information K.

According to the process at step SI2, the equation of C=Cmax is established, so that the determination at step SH5 becomes Y. Therefore, the process control is executed at step SH7. Accordingly, the setting of the color correction corresponds to the instruction of the process control in the color mode.

When the monochrome correction is set (Y at step SI3), the control section 12 substitutes the value of the monochrome printing cumulative operation information K in the monochrome threshold value Kmax, and the inhibition of the process control in the monochrome mode is released (step SI4), thereby completing the setting changing process. According to the process at step SI4, the equation of K=Kmax is established, so that the determination at step SH1 becomes Y. Therefore, the process control is executed at step SH3. Accordingly, the setting of the monochrome correction corresponds to the instruction of the process control in the monochrome mode.

When the setting of the color correction is released (Y at step SI5), the control section 12 substitutes the color predetermined value Ca in the color threshold value Cmax and releases the inhibition of the process control in the color mode (step SI6), thereby completing the setting changing process. When a user wishes to manually set the threshold value again, the control section 12 again inhibits the process control in the color mode so as not to execute the process control with the predetermined value Ca. The same is true for the monochrome mode.

In the case not applied to the cases described above, the control section 12 substitutes the monochrome predetermined value Ka in the monochrome threshold value Kmax, and releases the inhibition of the process control in the monochrome mode (SI7), thereby completing the setting changing process.

It is preferable that the predetermined value is set to be (monochrome predetermined value Ka)>(color predetermined value Ca). By virtue of this setting, the timing for executing the process control is advanced in the order of (monochrome mode)<(color mode), which agrees with the order of the printing definition generally demanded. Therefore, the timing for executing the process control can be made appropriate.

The various features shown in the embodiments can be combined. When plural features are included in one embodiment, one or plural features are appropriately extracted, and used singly or in combination to be employed for the present invention.

For example, the printing is executed before the determination as to whether the process control is executed or not in the second embodiment. However, like the first embodiment, the determination as to whether the process control is necessary or not is made before the printing is executed, and if necessary, the process control may be executed.

The first and second embodiments describe a color image forming apparatus as an example. However, the description in the first and second embodiments is applicable to a monochrome image forming apparatus. In this case, the description relating to the color image formation is omitted from the description in the first and second embodiments.

What is claimed is:

1. An image forming apparatus comprising: an image forming section including a photoconductor drum,
    a charging device for uniformly charging the photoconductor drum, an exposure device for exposing the photoconductor drum so as to form a latent image, and
    a developing device for depositing toner onto the latent image using a developing roller to develop the latent image;

a manual setting mode for enabling a user to provide instruction of timing for executing a process control of the image forming section;

a cumulative operation information management section for calculating and storing cumulative operation information after the execution of the previous process control;

a threshold value setting section for setting, to a threshold value, the cumulative operation information at the point when the instruction is provided in the manual setting mode; and a process control management section for executing a process control and resetting the cumulative operation information at timing when the cumulative operation information reaches the threshold value a print job determining section for determining whether the print job containing contents whose image is formed by the image forming section contains a color page or not so as to determine whether the print job is a color job or a monochrome job, wherein the image forming section includes a black image forming section used for both of color image formation and monochrome image formation, and a color image forming section used for the color image formation, the cumulative operation information management section calculates and stores the cumulative operation information in such a way the cumulative operation information is classified into monochrome cumulative operation information and color cumulative operation information in accordance with the determination at the print job determining section, the threshold value setting section sets, to a monochrome threshold value, the monochrome cumulative operation information at the point when the instruction of the process control in the monochrome mode is provided, and sets to a color threshold value, the color cumulative operation information at the point when the instruction of the process control in the color mode is provided, and the process control management section executes the process control for the black image forming section and resets the monochrome cumulative operation information at timing when the monochrome cumulative operation information reaches the monochrome threshold value, and the process control management section executes the process control for the black image forming section and the color image forming section and resets the monochrome cumulative operation information and the color cumulative operation information at timing when the color cumulative operation information reaches the color threshold value.

2. The apparatus of claim 1, further comprising an automatic setting mode in which the timing is automatically set, wherein the threshold value setting section sets a predetermined value to the threshold value in the automatic setting mode.

3. The apparatus of claim 1, wherein the process control management section inhibits the process control before the instruction is provided, and releases the inhibition of the process control according to the instruction.

4. The apparatus of claim 1, wherein the process control management section determines whether the cumulative operation information reaches the threshold value or not in units of print jobs each containing contents whose image is formed by the image forming section.

5. The apparatus of claim 1, wherein the cumulative operation information includes one or more of cumulative number of printing sheets, cumulative driving time of the developing roller, cumulative revolution of the developing roller, toner consumption amount, cumulative dot count value, (cumulative number of printing sheets)×(average printing ratio), and elapsed days.

6. An image forming apparatus comprising:

an image forming section including a photoconductor drum;

a charging device for uniformly charging the photoconductor drum;

an exposure device for exposing the photoconductor drum so as to form a latent image;

a developing device for depositing toner onto the latent image using a developing roller to develop the latent image;

a manual setting mode for enabling a user to provide instruction of timing for executing a process control of the image forming section;

a cumulative operation information management section for calculating and storing cumulative operation information after the execution of the previous process control;

a threshold value setting section for setting, to a threshold value, the cumulative operation information at the point when the instruction is provided in the manual setting mode; and a process control management section for executing a process control and resetting the cumulative operation information at timing when the cumulative operation information reaches the threshold value;

a print job determining section for determining whether the print job containing contents whose image is formed by the image forming section contains a color page or not, and whether the print job contains a photograph page or not, so as to determine whether the print job is a monochrome text job, a monochrome photograph job, a color text job or a color photograph job, wherein the image forming section includes a black image forming section used for both of color image formation and monochrome image formation, and a color image forming section used for the color image formation, the cumulative operation information management section calculates and stores the cumulative operation information in such a way that the cumulative operation information is classified into monochrome cumulative operation information and color cumulative operation information in accordance with the determination at the print job determining section, the threshold value setting section sets, to a monochrome text threshold value, the monochrome cumulative operation information at the point when the instruction of the process control in the monochrome text mode is provided, sets, to a monochrome photograph threshold value, the monochrome cumulative operation information at the point when the instruction of the process control in the monochrome photograph mode is provided, sets, to a color text threshold value, the color cumulative operation information at the point when the instruction of the process control in the color text mode is provided, and sets, to a color photograph threshold value, the color cumulative operation information at the point when the instruction of the process control in the color photograph mode is provided, and the process control management section executes the process control for the black image forming section and resets the monochrome cumulative operation information at timing when the monochrome cumulative operation information reaches the monochrome text threshold value or at timing when the monochrome cumulative operation information reaches the monochrome photograph threshold value in case the print job is the monochrome photograph job, and the process control management section executes the process control for the black image forming section and the color image forming section and resets the monochrome cumulative operation information and the color cumulative operation information at timing when the color cumulative operation information reaches the color text threshold value or at timing when the color cumulative operation information reaches the color photograph threshold value in case the print job is the color photograph job.

7. The apparatus of claim 1, further comprising an automatic setting mode in which the timing is automatically set, wherein the threshold value setting section sets a monochrome predetermined value to the monochrome threshold value, and sets a color predetermined value to the color threshold value in the automatic setting mode.

8. The apparatus of claim 6, further comprising an automatic setting mode in which the timing is automatically set, wherein the threshold value setting section sets a monochrome text predetermined value to the monochrome text threshold value, sets a monochrome photograph predetermined value to the monochrome photograph threshold value, sets a color text predetermined value to the color text threshold value, and sets a color photograph predetermined value to the color photograph threshold value in the automatic setting mode.

9. The apparatus of claim 8, wherein an inequality of (monochrome text predetermined value)>(monochrome photograph predetermined value)>(color text predetermined value)>(color photograph predetermined value) is established.

10. The apparatus of claim 1, wherein the process control management section executes the process control only for the black image forming section upon start of the image forming apparatus.

11. The apparatus of claim 1, wherein the print job determining section determines a page in which a color pixel ratio calculated from an equation of (color pixel number)÷(color-plus-black pixel number) is not less than a predetermined value, as a color page for each page in the print job.

12. The apparatus of claim 1, wherein the print job determining section determines a page in which a printing ratio calculated from an equation of (color-plus-black pixel number)÷(total pixel number) is not less than a predetermined value, as a photograph page for each page in the print job.

13. The apparatus of claim 6, wherein the process control management section executes the process control only for the black image forming section upon start of the image forming apparatus.

14. The apparatus of claim 6, wherein the print job determining section determines a page in which a color pixel ratio calculated from an equation of (color pixel number)÷(color-plus-black pixel number) is not less than a predetermined value, as a color page for each page in the print job.

15. The apparatus of claim 6, wherein the print job determining section determines a page in which a printing ratio calculated from an equation of (color-plus-black pixel number)÷(total pixel number) is not less than a predetermined value, as a photograph page for each page in the print job.

16. The apparatus of claim 6, wherein the cumulative operation information includes one or more of cumulative number of printing sheets, cumulative driving time of the developing roller, cumulative revolution of the developing roller, toner consumption amount, cumulative dot count value, (cumulative number of printing sheets)×(average printing ratio), and elapsed days.

17. The apparatus of claim 6, further comprising an automatic setting mode in which the timing is automatically set, wherein the threshold value setting section sets a predetermined value to the threshold value in the automatic setting mode.

18. The apparatus of claim 6, wherein the process control management section inhibits the process control before the instruction is provided, and releases the inhibition of the process control according to the instruction.

19. The apparatus of claim 6, wherein the process control management section determines whether the cumulative operation information reaches the threshold value or not in units of print jobs each containing contents whose image is formed by the image forming section.

* * * * *